(12) United States Patent
Kurian et al.

(10) Patent No.: US 11,638,229 B2
(45) Date of Patent: Apr. 25, 2023

(54) SELECTIVE PEER SYNCHRONIZATION WITH MUTUAL SERVICES

(71) Applicant: Apple Inc., Cupertino, CA (US)

(72) Inventors: Lawrie Kurian, San Jose, CA (US); Peter N. Heerboth, San Jose, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 793 days.

(21) Appl. No.: 15/823,173

(22) Filed: Nov. 27, 2017

(65) Prior Publication Data

US 2018/0249432 A1 Aug. 30, 2018

Related U.S. Application Data

(60) Provisional application No. 62/464,434, filed on Feb. 28, 2017.

(51) Int. Cl.
| | |
|---|---|
| H04W 56/00 | (2009.01) |
| H04W 8/00 | (2009.01) |
| H04L 67/104 | (2022.01) |
| H04W 4/80 | (2018.01) |
| H04L 67/51 | (2022.01) |
| H04W 84/12 | (2009.01) |

(52) U.S. Cl.
CPC ......... *H04W 56/002* (2013.01); *H04L 67/104* (2013.01); *H04L 67/51* (2022.05); *H04W 4/80* (2018.02); *H04W 8/005* (2013.01); *H04W 84/12* (2013.01)

(58) Field of Classification Search
CPC . H04W 56/002; H04W 4/80; H04W 56/0015; H04W 8/005; H04W 84/12; H04L 67/104; H04L 67/16
See application file for complete search history.

(56) References Cited

U.S. PATENT DOCUMENTS

| | | | | |
|---|---|---|---|---|
| 6,029,195 A | * | 2/2000 | Herz ..................... | G06Q 30/02 725/116 |
| 7,688,783 B1 | * | 3/2010 | Benveniste ....... | H04W 72/0406 370/328 |
| 7,688,802 B2 | | 3/2010 | Gonia et al. | |

(Continued)

FOREIGN PATENT DOCUMENTS

| | | |
|---|---|---|
| CN | 101345627 A | 1/2009 |
| CN | 101507189 A | 8/2009 |

(Continued)

OTHER PUBLICATIONS

First Office Action for CN Patent Application 201810164307.3; dated Sep. 1, 2021; 20 pages.

(Continued)

*Primary Examiner* — Matthew C Sams
(74) *Attorney, Agent, or Firm* — Kowert, Hood, Munyon, Rankin & Goetzel, P.C.

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for a device to perform selective synchronization (or cluster merging) with one or more neighboring peer devices.

20 Claims, 11 Drawing Sheets

(56) References Cited

U.S. PATENT DOCUMENTS

| | | | |
|---|---|---|---|
| 9,532,193 B2* | 12/2016 | Smadi | H04W 4/12 |
| 9,723,464 B2* | 8/2017 | Patil | H04W 8/005 |
| 10,051,441 B2* | 8/2018 | Smadi | H04W 4/12 |
| 2005/0021793 A1* | 1/2005 | Kubsch | H04L 29/06 709/229 |
| 2007/0136236 A1* | 6/2007 | Kussmaul | G06F 16/958 |
| 2010/0103841 A1* | 4/2010 | Lee | H04W 92/02 370/254 |
| 2014/0258395 A1* | 9/2014 | Tng | H04L 67/16 709/204 |
| 2015/0109961 A1* | 4/2015 | Patil | H04W 8/005 370/254 |
| 2015/0131529 A1 | 5/2015 | Zhou et al. | |
| 2015/0264123 A1* | 9/2015 | Smadi | H04W 4/12 709/206 |
| 2016/0014715 A1* | 1/2016 | Patil | H04W 52/0216 370/329 |
| 2016/0165653 A1* | 6/2016 | Liu | H04L 67/104 370/329 |
| 2016/0249200 A1* | 8/2016 | Liu | H04W 8/005 |
| 2016/0286461 A1* | 9/2016 | Patil | H04W 40/32 |
| 2016/0286476 A1* | 9/2016 | Patil | H04W 40/32 |
| 2017/0105102 A1* | 4/2017 | Smadi | H04W 4/12 |
| 2017/0150296 A1 | 5/2017 | Jung | |
| 2018/0027487 A1* | 1/2018 | Pang | H04W 48/16 370/338 |
| 2019/0014172 A1* | 1/2019 | Chaki | H04W 8/186 |

FOREIGN PATENT DOCUMENTS

| | | |
|---|---|---|
| CN | 101690038 A | 3/2010 |
| CN | 103067113 A | 4/2013 |
| CN | 103825694 A | 5/2014 |
| CN | 104703233 A | 6/2015 |
| CN | 104812101 A | 7/2015 |
| CN | 104869618 A | 8/2015 |
| CN | 104937907 A | 9/2015 |
| CN | 104937976 A | 9/2015 |
| CN | 105027593 A | 11/2015 |
| CN | 105027640 A | 11/2015 |
| CN | 105392156 A | 3/2016 |
| CN | 106211029 A | 12/2016 |
| CN | 106465092 A | 2/2017 |
| EP | 2 874 434 B1 | 8/2017 |
| WO | 2016115024 A1 | 7/2016 |
| WO | 2016118237 A1 | 7/2016 |
| WO | WO-2017037764 A1 * | 3/2017 ............ H04W 8/186 |

OTHER PUBLICATIONS

Notice of Allowance for CN Patent Application No. 201810164307. 3; 5 pages; Mar. 11, 2022.

"3rd Generation Partnership Project; Technical Specification Group Services and System Aspects; History of SA5 Telecom Management from 1998;" 3GPP TR 30.8SA5 v0.0.1; 263 pages; Aug. 2011.

Sunil et al. "Multi-Group Message Communication on Android Smartphones via WiFi Direct;" IEEE Xplore, 6 pages; Nov. 2017.

Shuo "Wi-Fi Direct Based Mobile P2P Networking and Application thereof;" Information Science and Technology Series, Chinese Doctoral Dissertations & Master's Theses Full-text Database (Master); 86 pages; Apr. 2013.

* cited by examiner

SELECTIVE PEER SYNCHRONIZATION WITH MUTUAL SERVICES

PRIORITY DATA

This application claims benefit of priority to U.S. Provisional Application Ser. No. 62/464,434, titled "Selective Peer Synchronization with Mutual Services," filed Feb. 28, 2017, by Lawrie Kurian, Peter N. Heerboth, and Yong Liu, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and/or multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, a device that wirelessly connects to other devices is referred to as a "station" or STA, "mobile station", "user device" or "user equipment" or UE for short. Wireless stations can be either wireless Access Points (APs) or wireless clients (or mobile stations). APs, which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices, such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to initiate, schedule and discover multicast groups.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to perform selective synchronization (or cluster merging) with one another.

In some embodiments, the communications may be performed via a peer-to-peer wireless communications protocol such as Neighbor Awareness Networking (NAN). Thus, embodiments of the disclosure also relate to NAN multicast group formation, including role selection and scheduling within the NAN framework. The NAN embodiments described herein provide a mechanism for a NAN device to initiate (or establish) and schedule a multicast group as well as to enroll neighboring NAN devices into a multicast group, merge multicast groups, and terminate multicast groups.

In some embodiments, a wireless station may be configured to synchronize timing to a first peer wireless station. The first peer wireless station may be a timing (or anchor) master of a first cluster of wireless stations. In addition, the wireless station may be configured to receive a beacon from a second peer wireless station via a peer-to-peer communication protocol. The beacon may include an indication of services supported by the second peer wireless station. In some embodiments, the indication of services supported comprises a hash of services supported by the second peer wireless station. The second peer wireless station may be configured to synchronize timing to a third peer wireless station, where the third peer wireless station may be a timing (or anchor) master of a second cluster of wireless stations. The wireless station may be further configured to determine, based at least in part on the indication of services supported, a service that is common to the wireless station and the second peer wireless station and initiate a merger of the first and second clusters.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
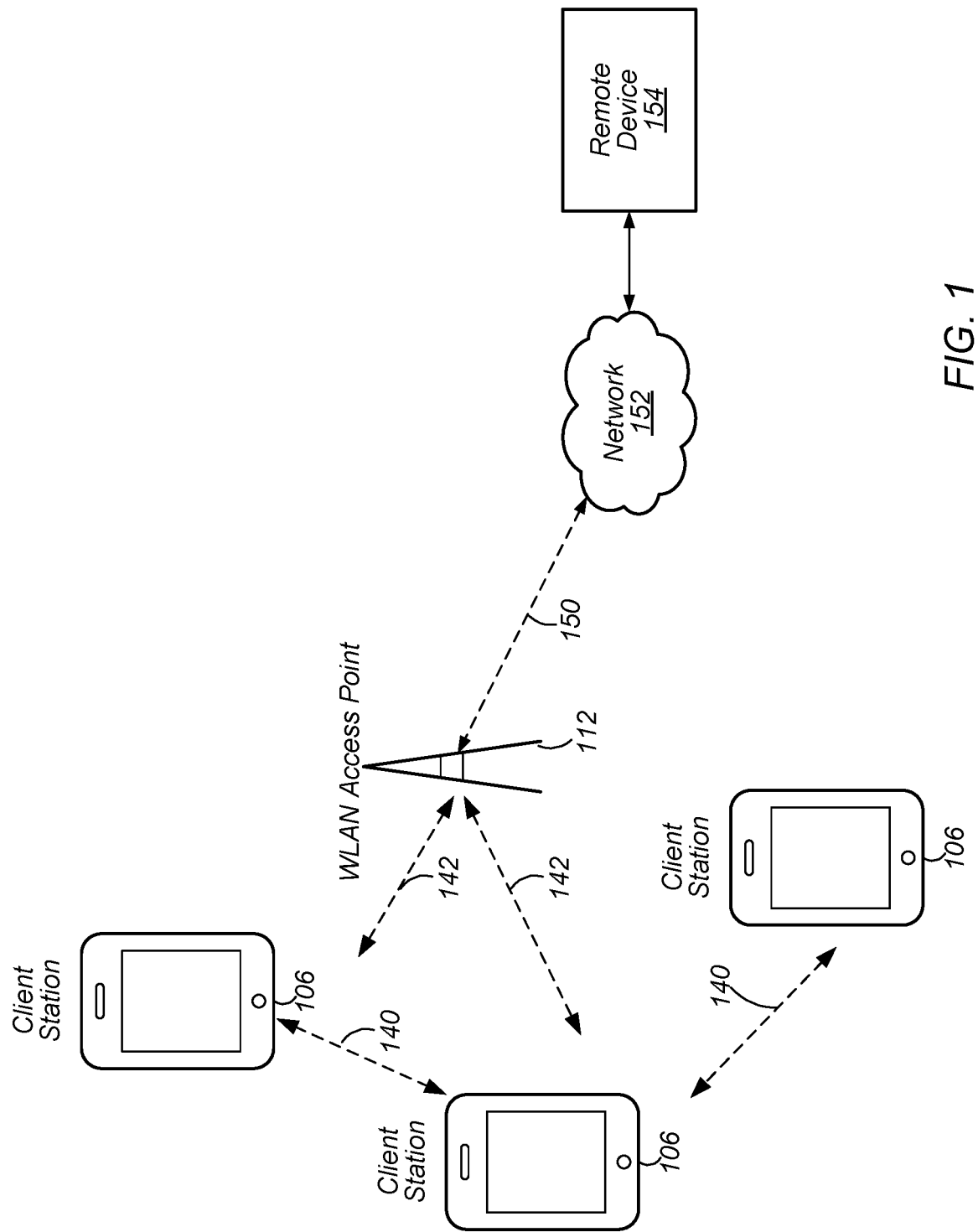
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station) —any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station) —any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL) —refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP) —refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC) —refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to synchronize timing to a first peer wireless device. The first peer wireless device may be a timing (or anchor) master of a first cluster of wireless devices. In addition, the wireless device 106 may be configured to receive a beacon from a second peer wireless device via a peer-to-peer communication protocol. The beacon may include an indication of services supported by the second peer wireless device. In some embodiments, the indication of services supported comprises a hash of services supported by the second peer wireless device. The second peer wireless device may be configured to synchronize timing to a third peer wireless device, where the third peer wireless device may be a timing (or anchor) master of a second cluster of wireless devices. The wireless device 106 may be further configured to determine, based at least in part on the indication of services supported, a service that is common to the wireless device 106 and the second peer wireless device, and initiate a merger of the first and second clusters.

Figure 2:
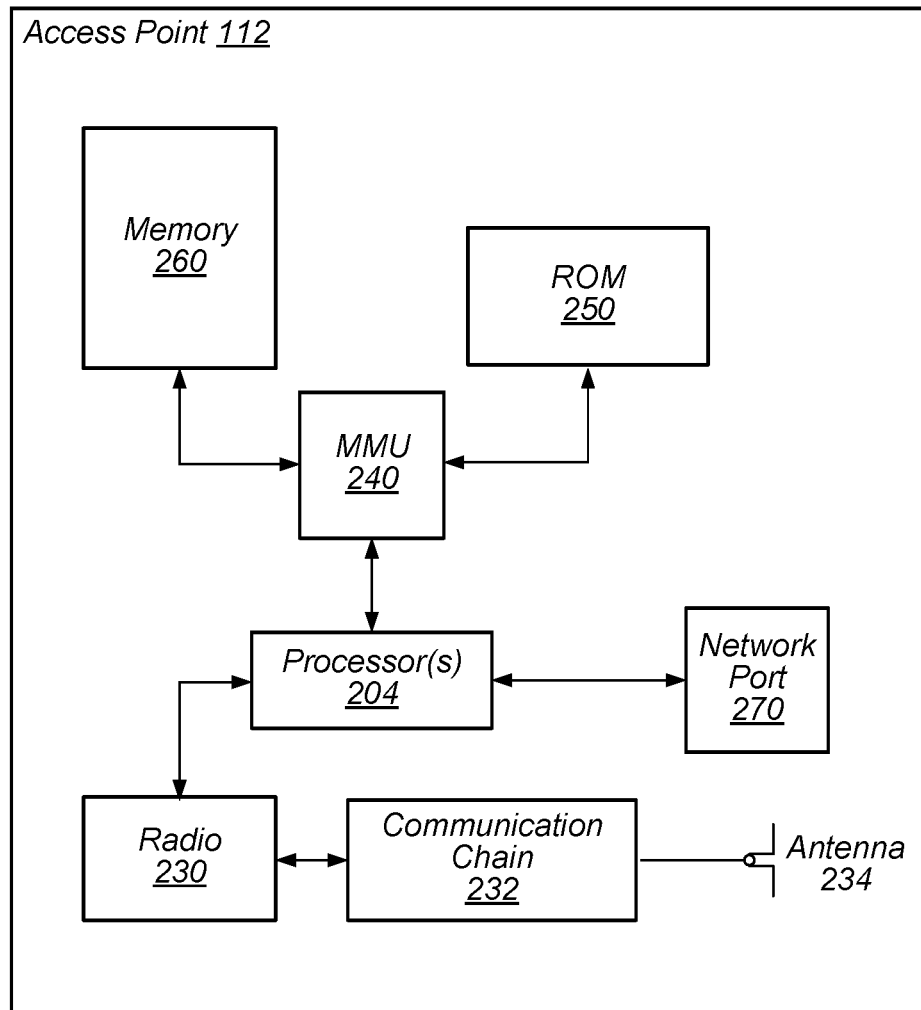
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to synchronize timing to a first peer wireless station. The first peer wireless station may be a timing (or anchor) master of a first cluster of wireless stations. In addition, the AP 112 may be configured to receive a beacon from a second peer wireless station via a peer-to-peer communication protocol. The beacon may include an indication of services supported by the second peer wireless station. In some embodiments, the indication of services supported comprises a hash of services supported by the second peer wireless station. The second peer wireless station may be configured to synchronize timing to a third peer wireless station, where the third peer wireless station may be a timing (or anchor) master of a second cluster of wireless stations. The AP 112 may be further configured to determine, based at least in part on the indication of services supported, a service that is common to the AP 112 and the second peer wireless station, and initiate a merger of the first and second clusters.

Figure 3:
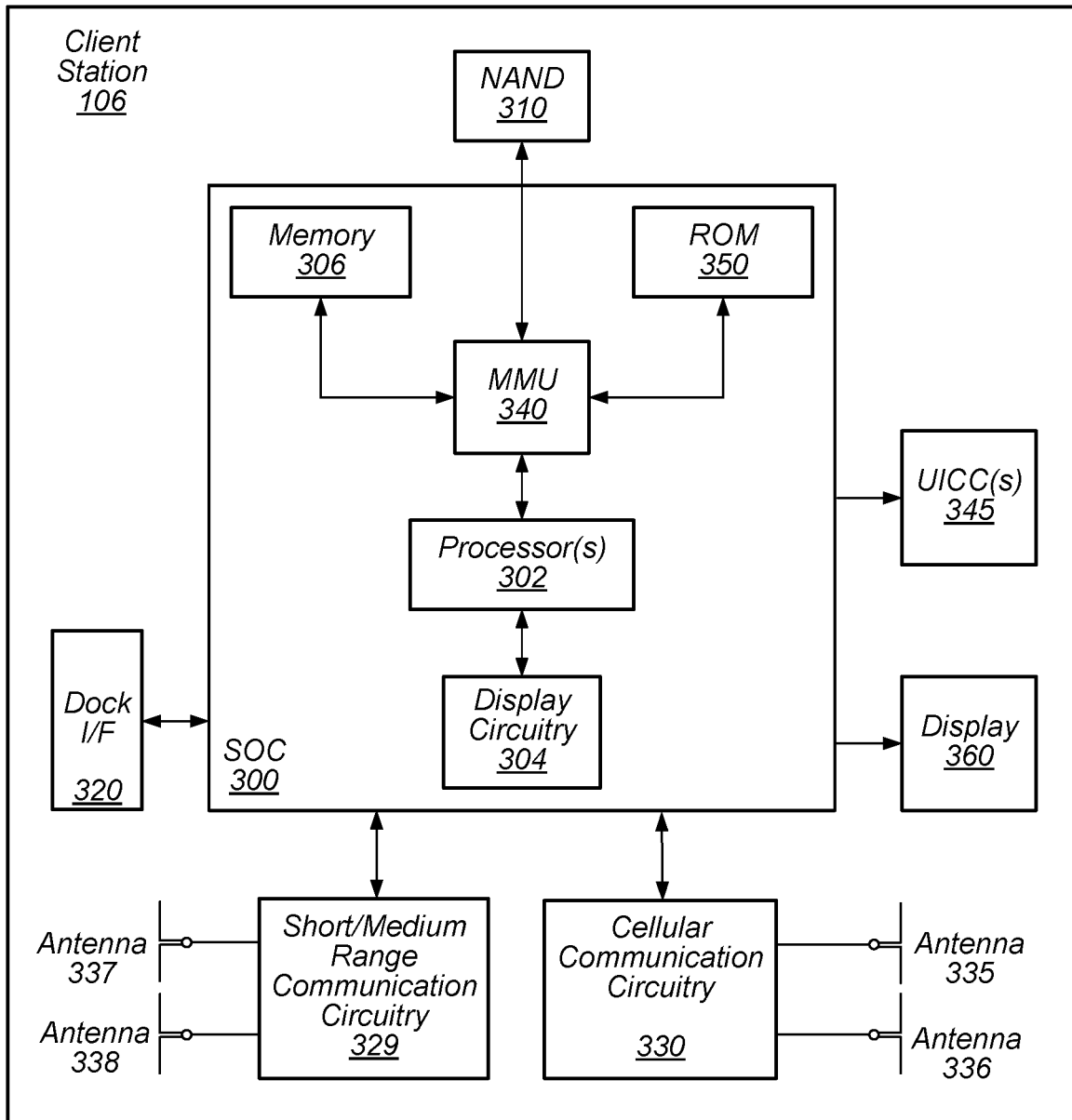
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to synchronize timing to a first peer client station. The first peer client station may be a timing (or anchor) master of a first cluster of wireless stations. In addition, the client station 106 may be configured to receive a beacon from a second peer client station via a peer-to-peer communication protocol. The beacon may include an indication of services supported by the second peer client station. In some embodiments, the indication of services supported comprises a hash of services supported by the second peer client station. The second peer client station may be configured to synchronize timing to a third peer client station, where the third peer client station may be a timing (or anchor) master of a second cluster of wireless stations. The client station 106 may be further configured to determine, based at least in part on the indication of services supported, a service that is common to the client station 106 and the second peer client station, and initiate a merger of the first and second clusters.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to synchronize to a neighboring wireless station based (at least in part) on a mutual (or common) service between the wireless stations.

Peer-to-Peer Synchronization Based on Mutual Services

Figure 4:
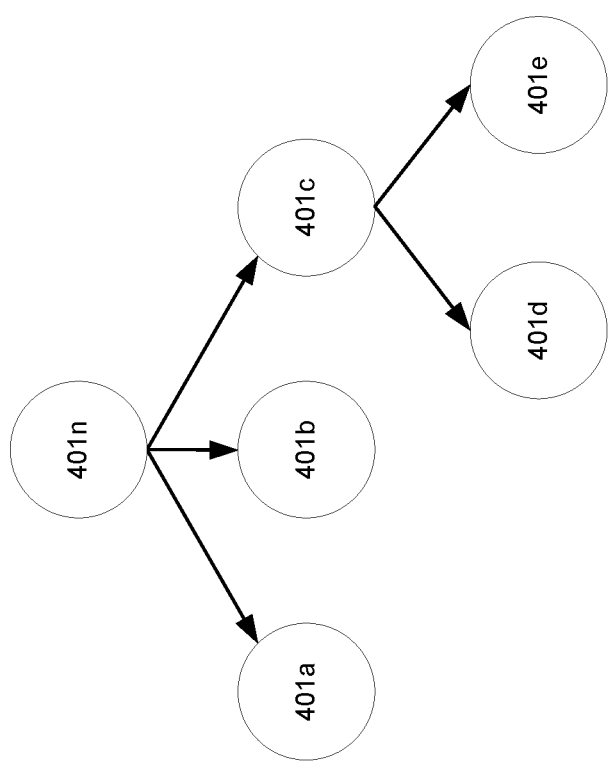
FIG. 4 illustrates an example of a cluster tree with anchor master, according to implementations.

In some implementations, peer wireless stations may transmit (or broadcast) synchronization and/or discovery beacons periodically on a social channel, e.g., a channel specified for transmission and/or reception of synchronization and/or discovery beacons within a peer-to-peer protocol that peer wireless stations may periodically tune to for reception and/or transmission (broadcast) of such beacons, among other processes, e.g., such as service negotiation and cluster management. For example, synchronization and/or discovery beacons may carry (or include) information that may be used to elect an anchor (or timing) master (e.g., a wireless station to which other wireless stations may synchronize, either via reception of a beacon from the anchor master or reception of a beacon that carries or includes information to allow for synchronization to the anchor master) and/or to form a synchronization tree (or cluster), e.g., as illustrated by FIG. 4. For example, in some implementations, a wireless station (e.g., wireless station 401n) with a highest rank as compared to neighboring wireless stations may be elected as the anchor master (or timing master). The rank may be based, at least in part, on a number of current peer-to-peer connections (data sessions such as a NAN datapath or NAN data link) of a wireless station, requirements of current peer-to-peer connections, such as quality of service and/or scheduling limitations. In other words, a wireless station with a most restrictive communication schedule may be elected anchor master. Note that communication schedules may become more restrictive as a number of peer-to-peer connections are increased and/or as quality of service requirements increase. Once elected, the anchor master may provide time synchronization for wireless stations within the synchronization tree (or cluster) via direct broadcast (and reception) of beacons from the anchor master (e.g., for wireless stations 401a-c) and/or via forwarding of synchronization information on behalf of the anchor master to wireless stations not within range to receive beacons from the anchor master (e.g., wireless station 401c may forward synchronization information received from wireless station 401n to wireless stations 401d and 401e). Note that synchronization and/or discovery beacons may also be used for service discovery.

Figure 5A:
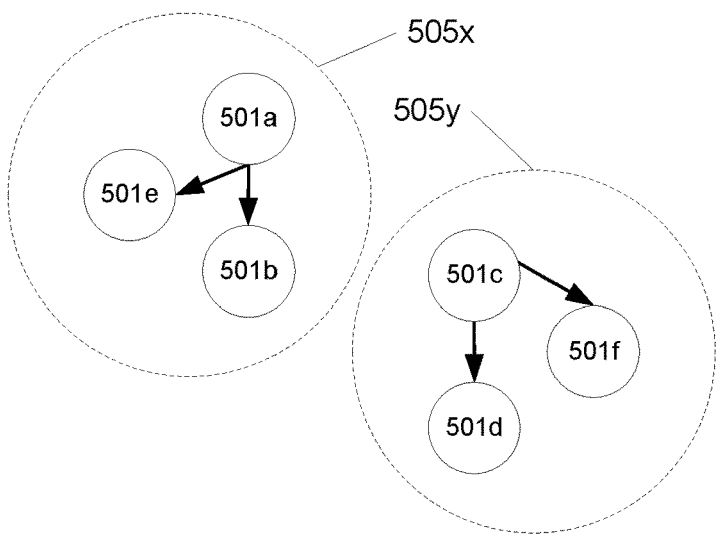
FIGS. 5A-C illustrate an example of merging (synchronization) of clusters, according to implementations.
Figure 5B:
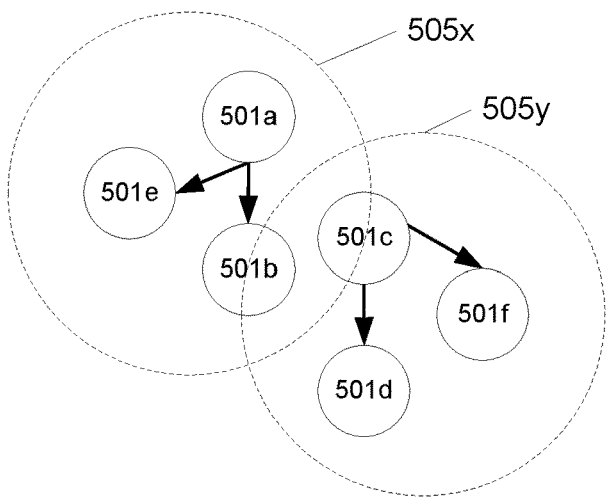
Figure 5C:
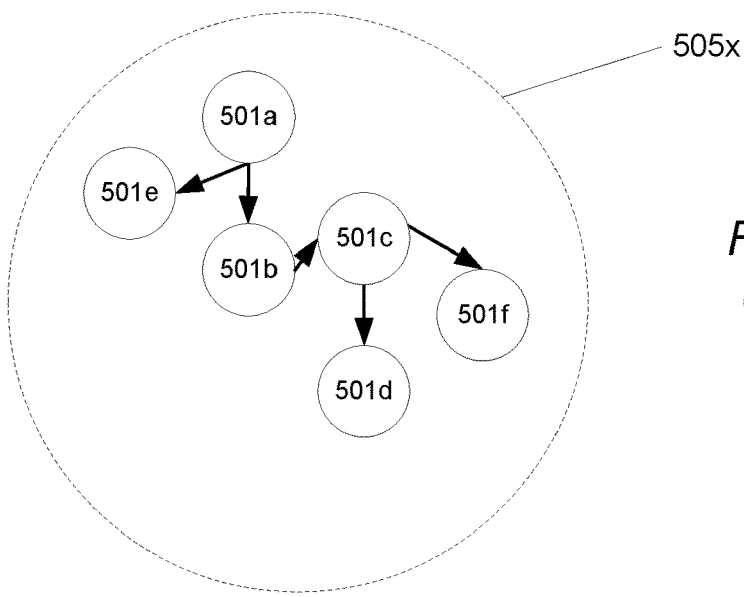

In addition to electing anchor masters and/or forming synchronization trees (or clusters) synchronization and/or discovery beacons may be implemented for synchronization tree (or cluster) merging. For example, as illustrated by FIGS. 5A-C, two clusters 505x and 505y may come within close proximity to one another as shown in FIG. 5A. As shown, device 501a may be an anchor master for cluster 505x and devices 501b and 501e may synchronize to device 501a. Similarly, device 501c may be an anchor master for cluster 505y and devices 501d and 501f may synchronize to device 501c. Progressing FIG. 5B, when device 501b and device 501c come within communication range (e.g., close proximity) of one another, a merging of cluster 505x and 505y can be initiated. During the merging, a new anchor master will be elected, e.g., based on rank. In the example shown, device 501a has a higher rank as compared to device 501c, thus when devices 501b and 501c exchange cluster information (e.g., via discovery and/or synchronization beacons), the devices (e.g., 501a-f) will elect device 501a as anchor master (e.g., based on device 501a having a higher rank than device C) and cluster 505y will merge into cluster 505x as shown by FIG. 5C. Thus, devices 501b-f will synchronize timing to device 501a. Note that the merging of clusters may occur irrespective of services supported by devices within each cluster. In other words, cluster merging can be implemented as a function of device synchronization to a highest ranking device and can be independent of whether devices within each cluster offer mutual or common services.

However, in some implementations and/or scenarios, timing adjustments associated with (or due to) cluster mergers—e.g., as described above devices 501c and 501d may be required to adjust timing in order to properly synchronize to device 501a—may momentarily effect (e.g., degrade) quality of service of current peer-to-peer data sessions. In addition, if the data session includes latency sensitive applications, e.g., display/screen mirroring, video and/or voice calls, and so forth, the potential degradation in quality of service may adversely impact user experience. For example, if during the merging of clusters 505x and 505y, devices 501a and 501b were performing a file transfer application while devices 501c and 501d were performing a low latency screen mirroring application, the merging of the clusters may cause visible degradation (e.g., screen glitches such as lost pixels, frame freezing, and/or frame jitter) in the mirroring application, thus adversely impacting user experience. In contrast, the merging may have little to no impact on user experience for the file transfer application between devices 501a and 501b, e.g., because the timing of devices 501a and 501b may not be impacted and because any impact on the file transfer may not be visible.

Thus, as this example illustrates, unconditional merging of clusters on a frequent basis may adversely affect quality of service of some applications, and in some instances the disruption may occur unnecessarily and in an uncontrollable manner. Embodiments described herein define methods (and/or mechanisms) for wireless stations (such as wireless station 106) to selectively (or conditionally) merge clusters based at least in part on mutuality of services offered within merging clusters. Such conditional merging may further provide a mechanism for controlling effects on quality of service as related to possible cluster mergers.

In some embodiments, a wireless station (e.g., such as wireless station 106) may transmit (or broadcast) a beacon(s) (e.g., discovery and/or synchronization) including information regarding services supported by the wireless station (e.g., as a provider and/or consumer). In some embodiments, the information may be included in a hash (e.g., service identifier (ID)) of all services supported by the wireless station. In some embodiments, the information may specify one or more parameters for synchronization, e.g., a service ID, a network name, and so forth.

In some embodiments, the wireless station may filter beacons received from peer (neighboring) wireless stations based in part on services supported by the wireless station. In other words, the wireless station may selectively consider received beacons based at least in part on whether a received beacon includes information regarding a service supported by the wireless station. In some embodiments, filtering beacons may include a comparison between services supported by the wireless station and services indicated as supported in the received beacon (e.g., a comparison of a local hash generated by the wireless station and hashes received from peer wireless stations). For example, the wireless station may attempt to synchronize to a peer wireless station if the wireless station determines (e.g., via the comparison) that the peer wireless supports a service also supported by the wireless station. In such instances, clusters associated with the wireless station and peer wireless station may merge based (at least in part) on common (or mutual) supported services. In contrast, the wireless station may not attempt to synchronize to a peer wireless station if/when the wireless station determines (e.g., via the comparison) that the peer wireless station does not support a service also supported by the wireless station (e.g., there is no common, supported service between the peers). In such instances, clusters associated with the wireless station and the peer wireless station may not merge based (at least in part) on a determination that there is no common (or mutual) supported services.

Note that a supported service may be considered or associated with a service that the wireless station is currently seeking, consuming, advertising, and/or providing. In other words, if the wireless station is not currently seeking, consuming, advertising, and/or providing services indicated in a beacon from a peer wireless station associated with another cluster, the wireless station may determine to not initiate a cluster merger (e.g., the wireless station may elect to not initiate a process of electing a new anchor master for a merged cluster and/or to not initiate a process for synchronizing to a new anchor master for the merged cluster). In addition, if the peer wireless station remains in range and continues to receive beacons from the peer wireless station, the wireless station may initiate a cluster merger based on the wireless station newly seeking (or consuming, advertising, and/or providing) a service indicated in the received beacon and/or the peer wireless station indicating additional services in the beacons that match a service (or services) provided/sought/consumed/advertised by the wireless station.

For example, the wireless station may be capable of consuming a service advertised by a peer wireless station, however, if the wireless station is not currently seeking the service, the wireless station may determine to not initiate a merger of associated clusters based in part on not currently seeking the advertised service. As another example, the wireless station may be consuming a service and may receive a beacon indicating that a peer wireless device associated with another cluster is currently seeking the service being consumed by the wireless station. In such an instance, the wireless station may initiate a cluster merger based at least in part on the service being sought by the peer wireless station and thus being common to the wireless station and peer wireless station. As a further example, the wireless station may be capable of providing a service, but may not be actively advertising the service. However, upon determining a peer wireless station is actively seeking the service, the wireless station may initiate a merger of associated clusters based, at least in part, on the service being common to the wireless station and peer wireless station. As another example, the wireless station may be providing a service and may receive a beacon indicating that a peer wireless device associated with another cluster is currently seeking the service being provided by the wireless station. In such an instance, the wireless station may initiate a cluster merger based at least in part on the service being sought by the peer wireless station and thus being common to the wireless station and peer wireless station.

In some embodiments, selective merging (or synchronization), e.g., as described above, may be activated based on one or more criteria at the wireless station. In other words, the wireless station may enable selective merging (or synchronization) if one or more criteria are present at the wireless station and may alternatively synchronize to peer wireless stations without regard to services supported by the wireless station and the peer wireless station. For example, the wireless station may enable selective merging (or synchronization) if the wireless station is currently providing and/or consuming an application that requires low latency (e.g., has relatively higher quality of service requirements) and may disable selective merging if the wireless station is not currently providing and/or consuming an application that requires low latency. For example, if a wireless station is providing and/or consuming a higher quality of service application, such as display/screen mirroring and/or video or voice calls, the wireless station may enable selective merging. In contrast, if the wireless station is providing and/or consumer a lower quality of service application, the wireless station may disable selective merging.

Figure 6A:
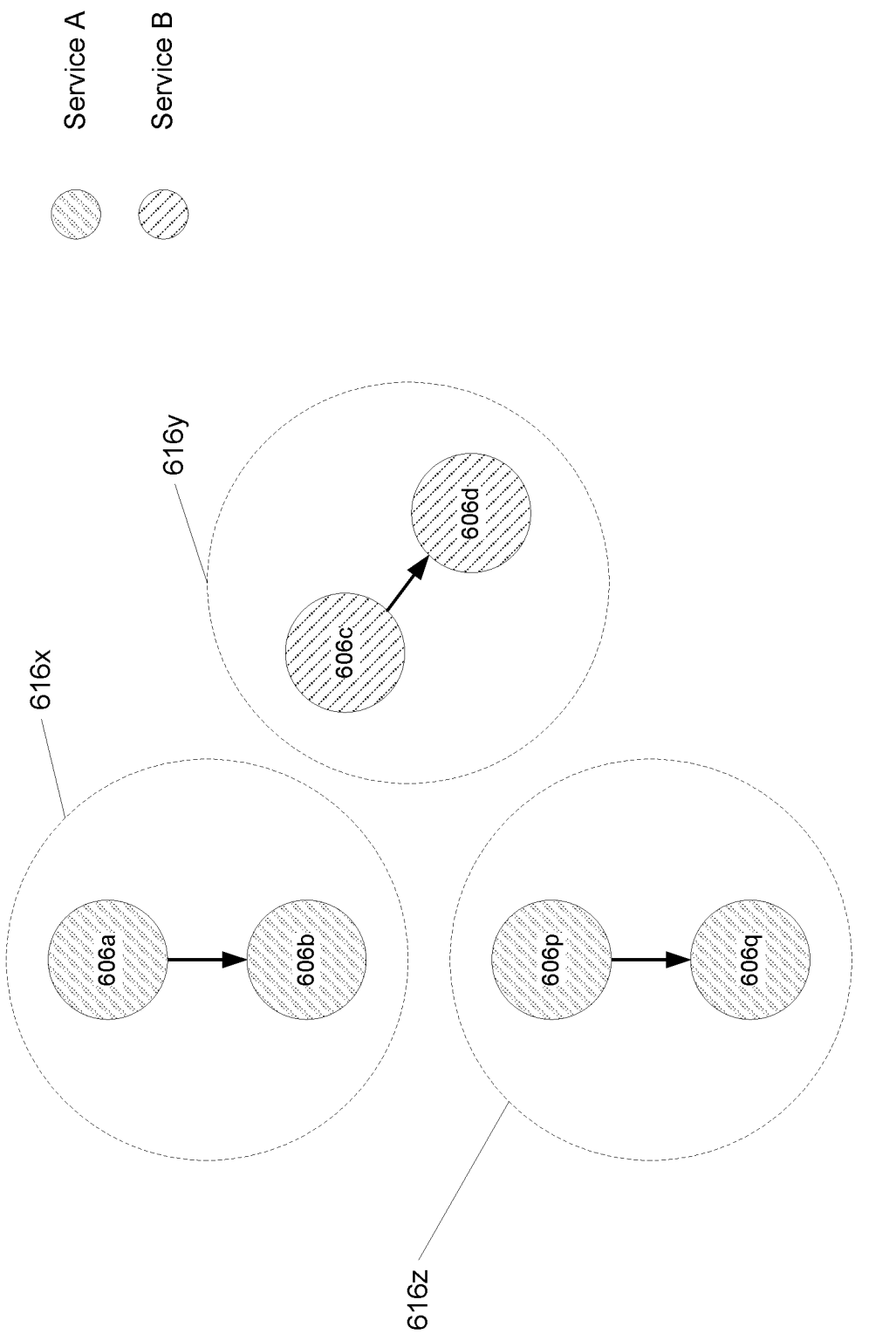
FIGS. 6A-D illustrate an example of selective merging (synchronization) of clusters, according to some embodiments.

FIGS. 6A-D illustrate an example of selective merging (synchronization) of clusters, according to some embodiments. As shown by FIG. 6A, three clusters may be approaching one another. Cluster 616x may include devices 606a and 606b (the devices may each be a client station 106 as described above) and device 606a may be cluster 616x's anchor master. In addition, device 606b may be consuming (or providing) service A from (or to) device 606a. Cluster 616y may include devices 606c and 606d (the devices may each be a client station 106 as described above) and device 606c may be cluster 616y's anchor master. In addition, device 606d may be consuming (or providing) service B from (or to) device 606c. Cluster 616z may include devices 606p and 606q (the devices may each be a client station 106 as described above) and device 606p may be cluster 616z's anchor master. In addition, device 606q may be consuming (or providing) service A from (or to) device 606p. Note that device 606a may have a higher rank than device 606p and device 606p may have a higher rank than device 606c.

Figure 6B:
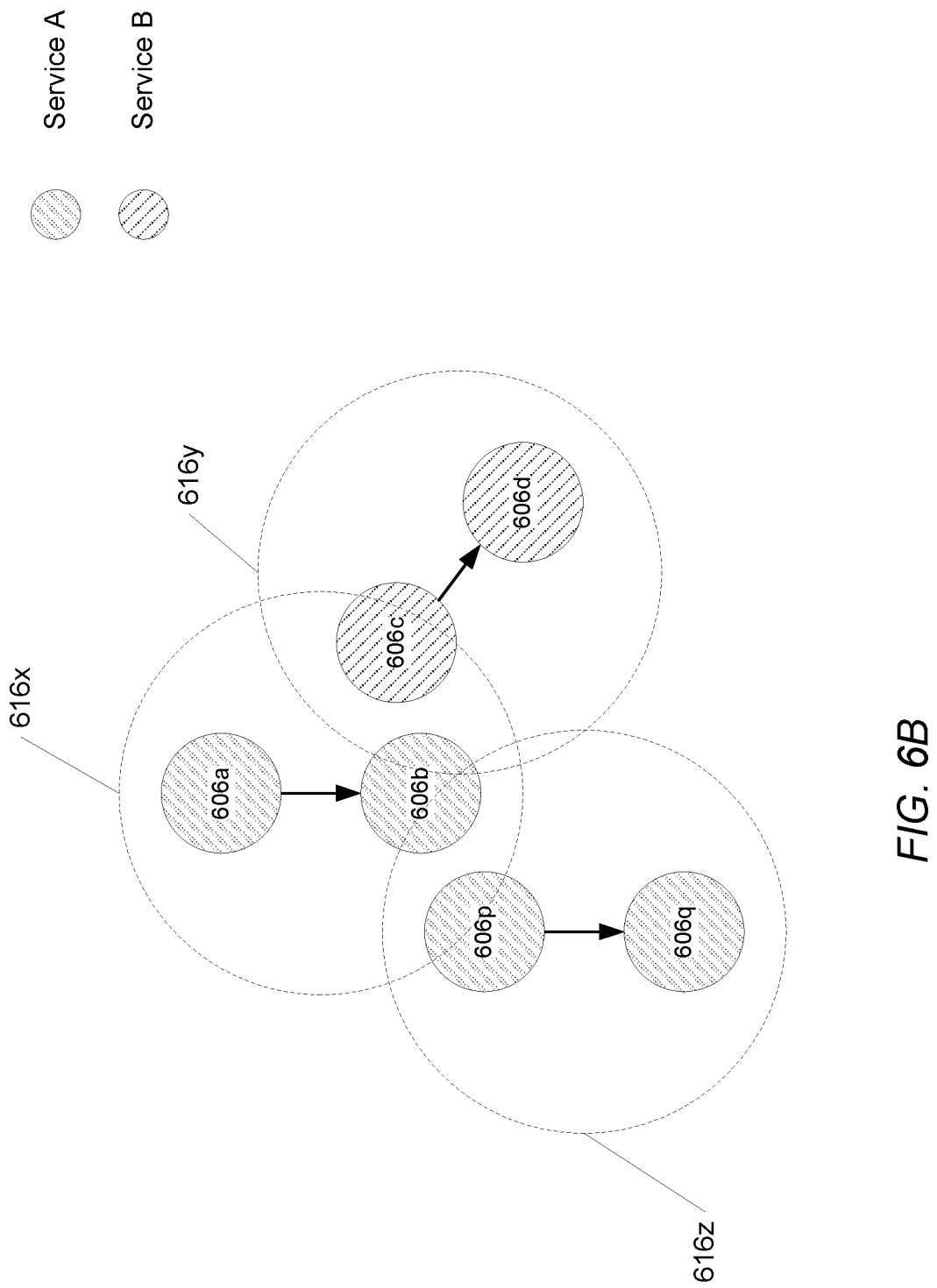
Figure 6C:
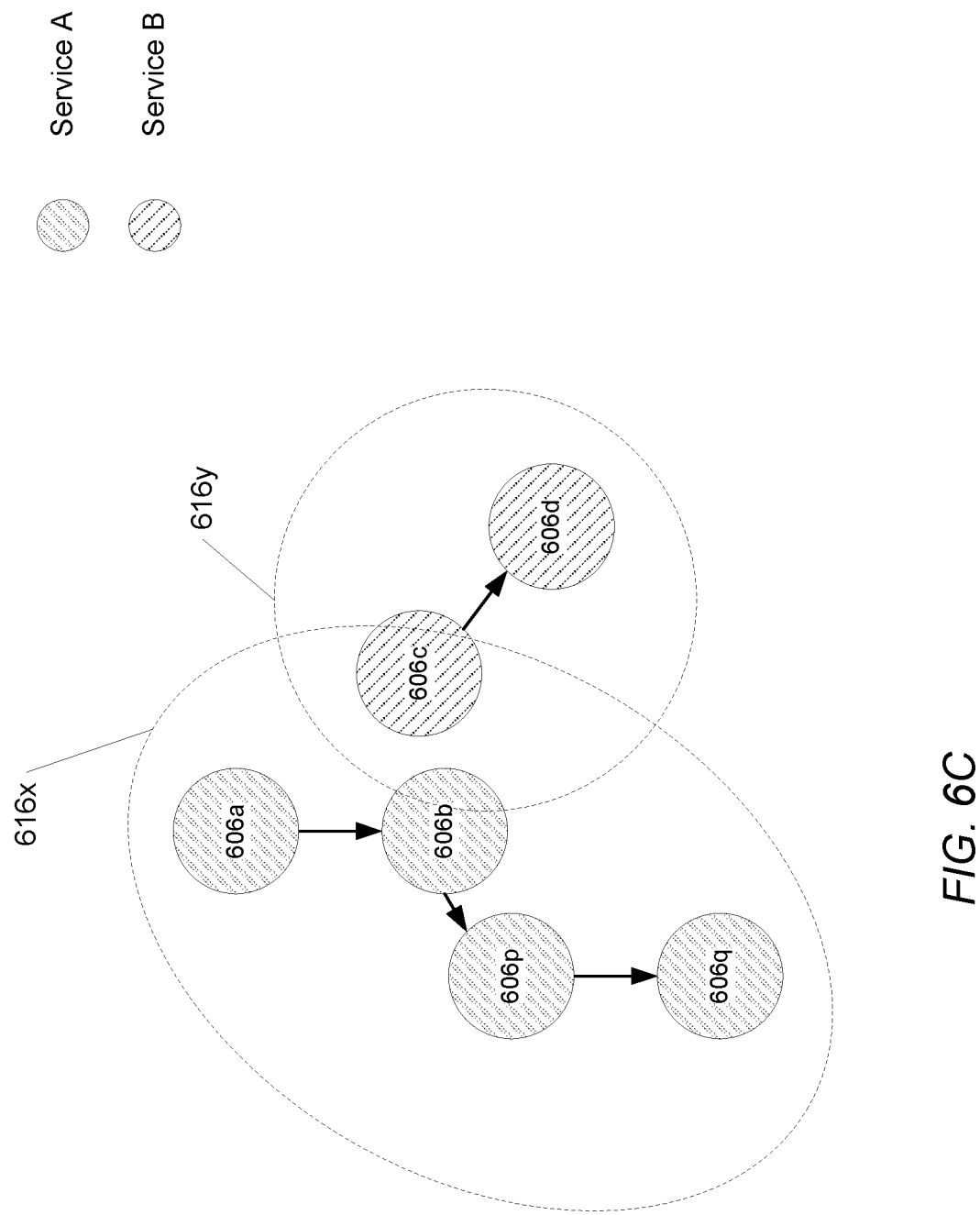

Continuing to FIG. 6B, clusters 616x, 616y, and 616z may move within range of one another. In other words, at least device 606b may be within communication range of devices 606p and 606c, e.g., device 606b may receive beacons from devices 606p and 606c, and device 606p and 606c may receive beacons from device 606b. Continuing to FIG. 6C, device 606b may compare service information included in beacons received from devices 606p and 606c, and may determine that there is a common (mutual) service between devices 606b and 606p (e.g., service A), but not between devices 606b and 606c. Thus, device 606b (or similarly device 606p) may initiate a cluster merger between clusters 616x and 616z. Further, since device 606a has a higher rank than device 606p, device 606a may remain anchor master of cluster 616x and devices 606b, 606p, and 606q may synchronize to device 606a.

Figure 6D:
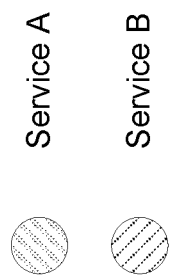
Figure 6D:
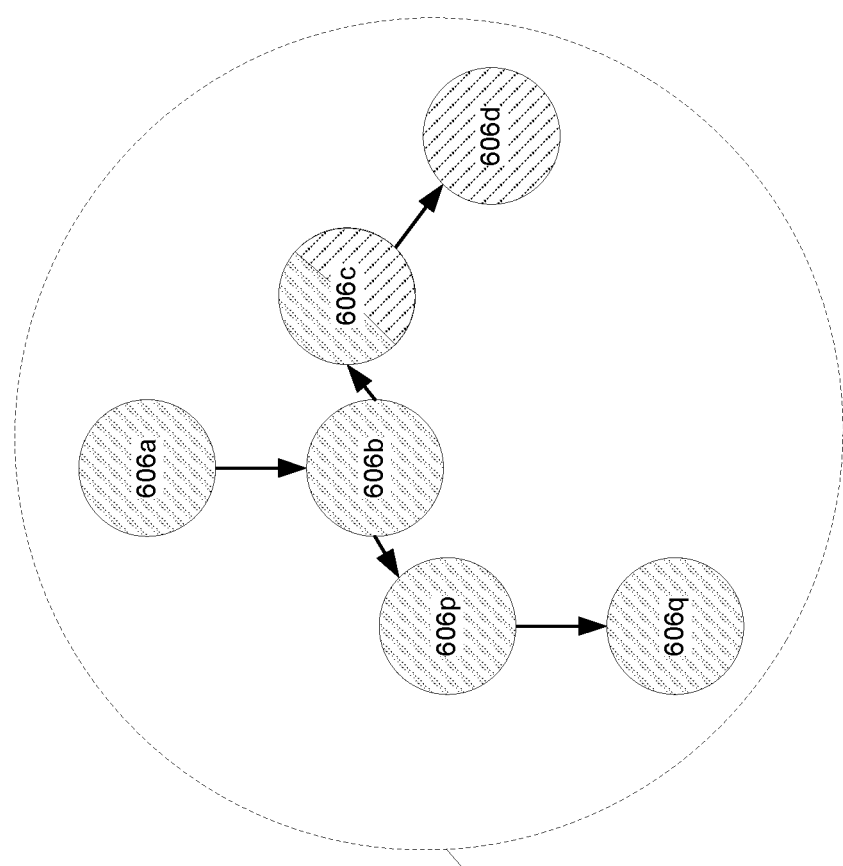

Continuing to FIG. 6D, at a later point in time, device 606c may register (or seek/advertise) service A while remaining in proximity of device 606b. Thus, device 606b (or similarly device 606c) may initiate a cluster merger between clusters 616x and 616y, based, at least in part, on the common (mutual) service A. Further, since device 606a has a higher rank than device 606p, device 606a may remain anchor master of cluster 616x and devices 606b, 606c, 606d, 606p, and 606q may synchronize to device 606a.

Figure 7:
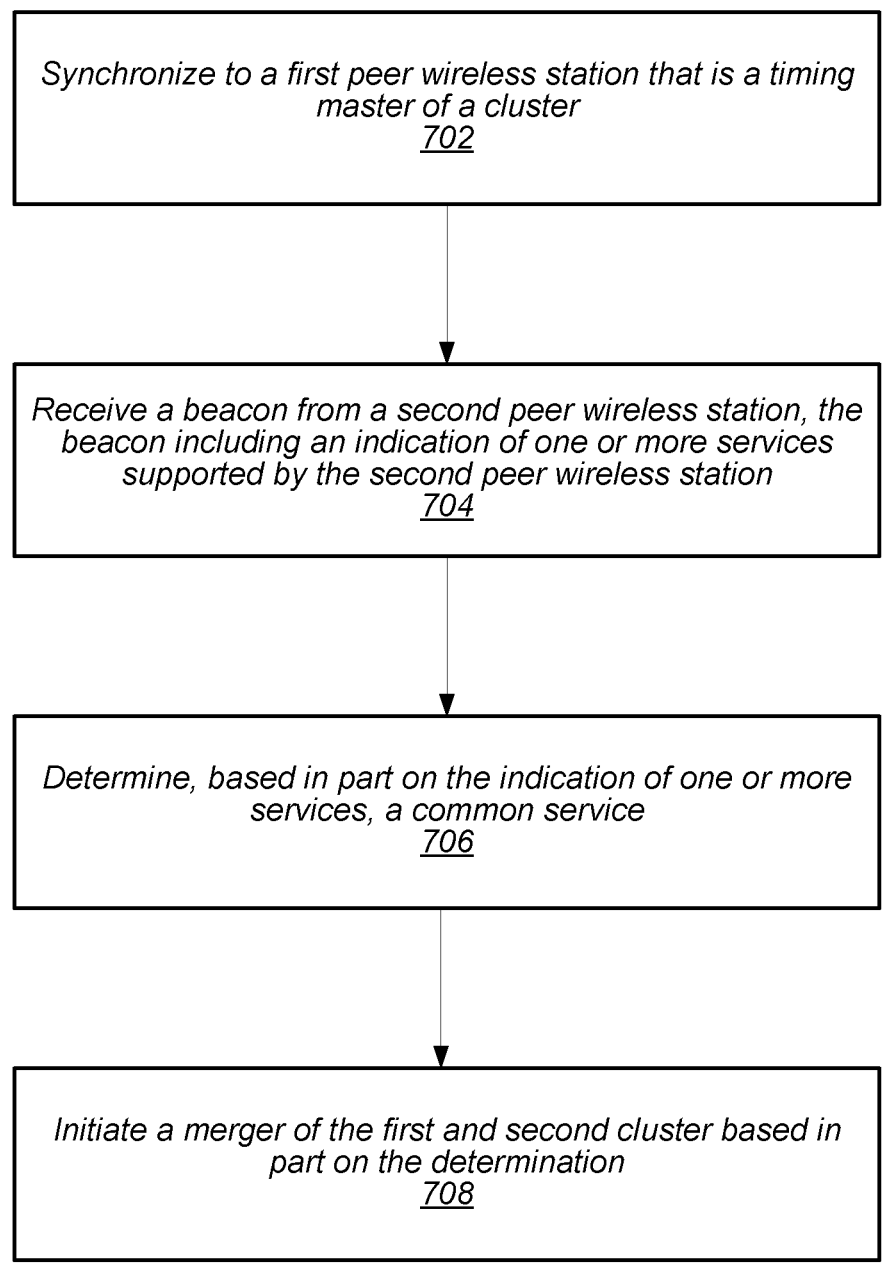
FIG. 7 illustrates a block diagram of an example of a method for selective merging (synchronization) of clusters, according to some embodiments.

FIG. 7 illustrates a block diagram of an example of a method for selective merging (synchronization) of clusters, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a wireless station, such as client station 106 described above, may synchronize timing to a first peer wireless station (e.g., a neighboring wireless station). The first peer wireless station may be a timing (or anchor) master of a first cluster of wireless stations. The wireless station and the first peer wireless station may be associated with the first cluster.

At 704, the wireless station may receive a beacon from a second peer wireless station. The beacon may be received via a peer-to-peer communication protocol. In some embodiments, the beacon may include an indication of one or more services supported by the second peer wireless station. In some embodiments, the indication of one or more services supported may include a service hash of services supported by the second peer wireless station. In some embodiments, the indication of services supported may specify at least one parameter for synchronization. In some embodiments, the at least one parameter may include at least one of (or one or more of) a service identifier, a hash of supported services, and/or a network name. In some embodiments, the services supported by the second peer wireless station may include at least one of (or one or more of) a service provided by the second peer wireless station, a service consumed by the second peer wireless station, a service advertised by the second peer wireless station, and/or a service sought by the second peer wireless station.

In addition, in some embodiments, the second peer wireless station may be configured to synchronize timing to a third peer wireless station and the third peer wireless station may be a timing (or anchor) master of a second cluster of wireless stations. The second and third peer wireless stations may be associated with the second cluster.

At 706, the wireless station may determine based, at least in part, on the indication of one or more services supported, a service that is common to both the wireless station and the second peer wireless station (e.g., a common service between the wireless station and the second peer wireless station). In some embodiments, to determine the service that is common to the wireless station and the second peer wireless station, the wireless station may generate a local hash of services supported by the wireless station and compare the local hash to the service hash. In some embodiments, the service that is common to the wireless station and the second peer wireless station may include at least one of (or one or more of) a service provided by the second peer wireless station and sought or consumed by the wireless station, a service consumed by the second peer wireless station and sought, advertised, or provided by the wireless station, a service advertised by the second peer wireless station and sought or consumed by the wireless station, a service sought by the second peer wireless station and advertised or provided by the wireless station, a service provided by the wireless station and sought or consumed by the second peer wireless station, a service consumed by the wireless station and sought, advertised, or provided by the second peer wireless station, a service advertised by the wireless station and sought or consumed by the second peer wireless station, and/or a service sought by the wireless station and advertised or provided by the second peer wireless station.

At 708, the wireless station may initiate a merger of the first cluster and the second cluster. The merger may be based, at least in part, on determination of the common service. For example, in some embodiments, the wireless station may initiate a merger process that may include election of a new anchor (or timing) master and/or the wireless station may initiate a process in which the wireless station and the second peer wireless station determine which of the first and third wireless stations to continue to synchronize timing with, e.g., based on a rank of the first and third peer wireless stations. In some embodiments, the merger may result in the wireless station and the first peer wireless station beginning to synchronize timing with the third peer wireless station. In some embodiments, the merger may result in the second and third peer wireless stations beginning to synchronize timing with the first peer wireless station. In other words, in some embodiments, the first and second clusters may merge into a third cluster and an anchor (or timing) master of the third cluster may be one of the first or third peer wireless stations, e.g., based on device rank within the third cluster of the first and third peer wireless stations.

In some embodiments, the wireless station may receive a beacon from a fourth peer wireless station. In some embodiments, the beacon may be received via the peer-to-peer communication protocol. In some embodiments, the beacon may include an indication of services supported by the fourth peer wireless station and the fourth peer wireless station may be configured to synchronize timing to a fifth peer wireless station. Further, the fifth peer wireless station may be a timing (anchor) master of a third cluster of wireless stations. The wireless station may determine, based at least in part on the indication of services supported by the fourth peer wireless station, that there are no services that are common to the wireless station and the fourth peer wireless station. In such embodiments, the wireless station may determine not to initiate a merger of the first cluster with the third cluster.

Figure 8:
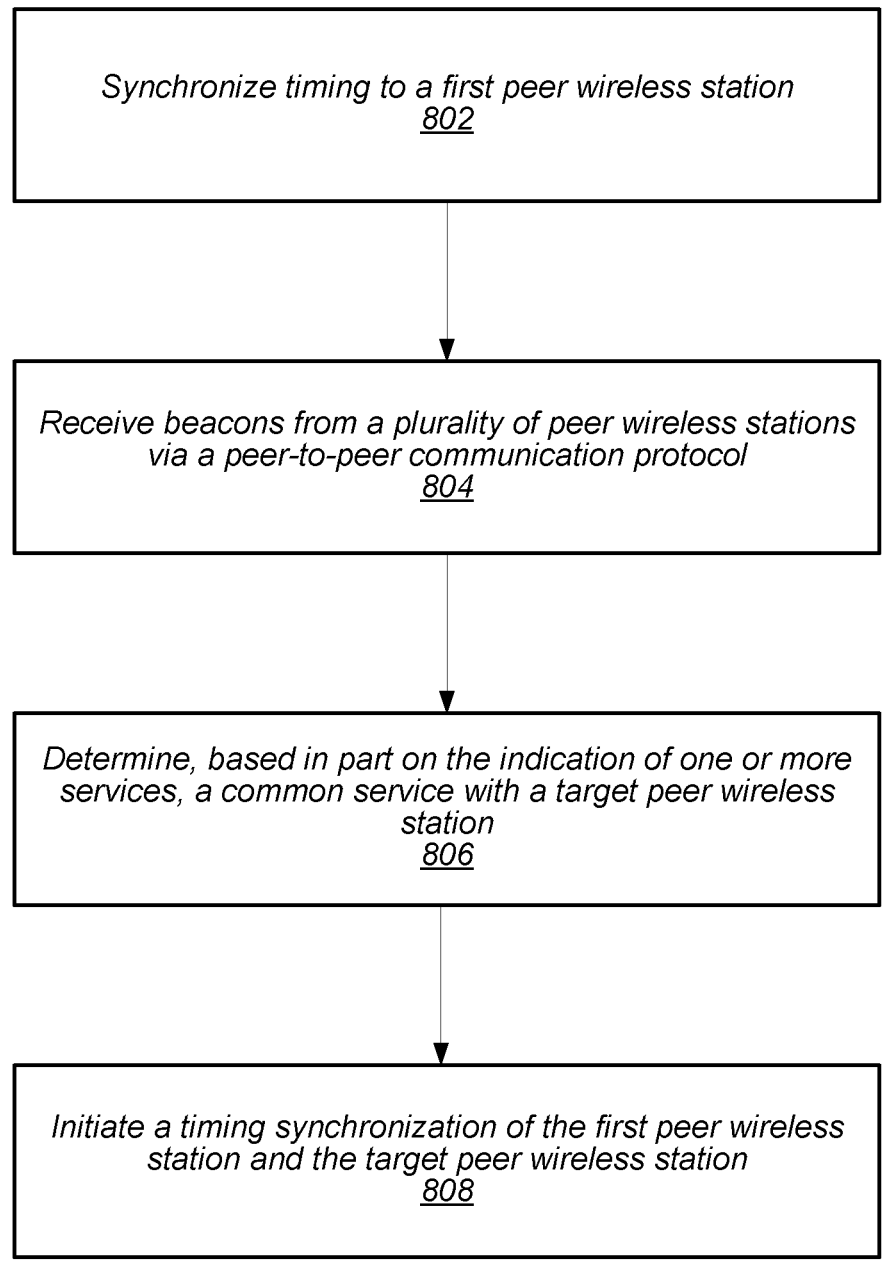
FIG. 8 illustrates a block diagram of an example of a method for selective synchronization of peer devices based on supported services, according to some embodiments.

FIG. 8 illustrates a block diagram of an example of a method for selective synchronization of peer devices based on supported services, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, a wireless station, which may be a client station 106 as described above, may synchronize timing to a first peer wireless station. In some embodiments, the wireless station and the first peer wireless station may be associated with a first cluster of devices. In some embodiments, the first peer wireless station may be a timing (or anchor master) of the first cluster of devices.

At 804, the wireless station may receive beacons from a plurality of peer wireless stations via a peer-to-peer communication protocol. The beacons may include indications of services supported by the peer wireless stations. The peer wireless stations may not synchronize timing to the first peer wireless station. In some embodiments, the peer wireless stations may be associated with one or more clusters of devices not associated with the first cluster of devices. In some embodiments, the indication of services supported may include hashes of services supported by the plurality of peer wireless stations. In some embodiments, the indication of services supported may specify at least one parameter for synchronization. In some embodiments, the at least one parameter may include at least one of (or one or more of) a service identifier, a hash of supported services, and/or a network name. In some embodiments, the services supported may include at least one of (or one or more of) a service provided, a service consumed, a service advertised, and/or a service sought.

At 806, the wireless station may determine, based at least in part on the indications of services supported by the peer wireless stations, a common service with a target peer wireless station of the plurality of peer wireless stations. In some embodiments, to determine the common service, the wireless station may generate a local hash of supported services and compare the local hash to the hashes of services supported by the plurality of peer wireless stations. In some embodiments, the service that is common to the wireless station and the target peer wireless station may include at least one of (or one or more of) a service provided by the target peer wireless station and sought or consumed by the wireless station, a service consumed by the target peer wireless station and sought, advertised, or provided by the wireless station, a service advertised by the target peer wireless station and sought or consumed by the wireless station, a service sought by the target peer wireless station and advertised or provided by the wireless station, a service provided by the wireless station and sought or consumed by the target peer wireless station, a service consumed by the wireless station and sought, advertised, or provided by the target peer wireless station, a service advertised by the wireless station and sought or consumed by the target peer wireless station, and/or a service sought by the wireless station and advertised or provided by the target peer wireless station.

At 808, the wireless station may initiate a timing synchronization of the target peer wireless station and the first peer wireless station. In some embodiments, the initiation of timing synchronization may be based, at least in part, on the determination of the common service.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio in communication with the at least one antenna and configured to perform communications via a Wi-Fi interface; and
at least one processor in communication with the at least one radio;
wherein the at least one processor is configured to cause the wireless station to:
synchronize timing to a first peer wireless station, wherein the first peer wireless station is a timing master of a first cluster of wireless stations;
receive a beacon from a second peer wireless station via a peer-to-peer communication protocol, wherein the beacon includes an indication of one or more services supported by the second peer wireless station, wherein the indication of the one or more services supported specifies at least one parameter for synchronization, wherein the second peer wireless station is configured to synchronize timing to a third peer wireless station, and wherein the third peer wireless station is a timing master of a second cluster of wireless stations;
determine, based at least in part on the indication of one or more services supported, a service that is common to both the wireless station and the second peer wireless station; and
initiate a merger of the first cluster and the second cluster.

2. The wireless station of claim 1,
wherein the indication of one or more services supported comprises a service hash of services supported by the second peer wireless station.

3. The wireless station of claim 2,
wherein to determine a service that is common to the wireless station and the second peer wireless station, the at least one processor is further configured to:
generate a local hash of services supported by the wireless station; and
compare the local hash to the service hash.

4. The wireless station of claim 1,
wherein the at least one parameter comprises at least one of:
a service identifier;
a hash of supported services; or
a network name.

5. The wireless station of claim 1,
wherein the at least one processor is further configured to:
receive a beacon from a fourth peer wireless station via a peer-to-peer communication protocol, wherein the beacon includes an indication of services supported by the fourth peer wireless station, wherein the fourth peer wireless station is configured to synchronize timing to a fifth peer wireless station, wherein the fifth peer wireless station is a timing master of a third cluster of wireless stations;
determine, based at least in part on the indication of services supported by the fourth peer wireless station, that there are no services that are common to the wireless station and the fourth peer wireless station; and
determine not to initiate a merger of the first cluster with the third cluster.

6. The wireless station of claim 1,
wherein services supported by the second peer wireless station comprise at least one of:
a service provided by the second peer wireless station;
a service consumed by the second peer wireless station;
a service advertised by the second peer wireless station; or
a service sought by the second peer wireless station.

7. The wireless station of claim 1,
wherein the service that is common to the wireless station and the second peer wireless station comprises at least one of:
a service provided by the second peer wireless station and sought or consumed by the wireless station;
a service consumed by the second peer wireless station and sought, advertised, or provided by the wireless station;
a service advertised by the second peer wireless station and sought or consumed by the wireless station;
a service sought by the second peer wireless station and advertised or provided by the wireless station;
a service provided by the wireless station and sought or consumed by the second peer wireless station;
a service consumed by the wireless station and sought, advertised, or provided by the second peer wireless station;
a service advertised by the wireless station and sought or consumed by the second peer wireless station; or
a service sought by the wireless station and advertised or provided by the second peer wireless station.

8. An apparatus, comprising:
a memory; and
at least one processor in communication with the memory;
wherein the at least one processor is configured to:
synchronize timing to a first peer wireless station;
receive beacons from a plurality of peer wireless stations via a peer-to-peer communication protocol, wherein the beacons include indications of services supported by the peer wireless stations, wherein the peer wireless stations do not synchronize timing to the first peer wireless station;
determine, based at least in part on the indications of services supported by the peer wireless stations, a common service with a target peer wireless station of the plurality of peer wireless stations; and
initiate a timing synchronization of the target peer wireless station and the first peer wireless station.

9. The apparatus of claim 8,
wherein the indication of services supported comprises hashes of services supported by the plurality of peer wireless stations.

10. The apparatus of claim 9,
wherein to determine a common service, the at least one processor is further configured to:
generate a local hash of supported services; and
compare the local hash to the hashes of services supported by the plurality of peer wireless stations.

11. The apparatus of claim 8,
wherein the indication of services supported specifies at least one parameter for synchronization.

12. The apparatus of claim 11,
wherein the at least one parameter comprises at least one of:
a service identifier;
a hash of supported services; or
a network name.

13. The apparatus of claim 8,
wherein services supported by the target peer wireless station comprise one or more of:
a service provided by the at least one wireless station;
a service consumed by the at least one wireless station;
a service advertised by the at least one wireless station; or
a service sought by the at least one peer wireless station.

14. The apparatus of claim 8,
wherein the common service comprises at least one of:
a service provided by the at least one peer wireless station and sought or consumed by an application in communication with the apparatus;
a service consumed by the at least one peer wireless station and sought, advertised, or provided by an application in communication with the apparatus;
a service advertised by the at least one peer wireless station and sought or consumed by an application in communication with the apparatus;
a service sought by the at least one peer wireless station and advertised or provided by an application in communication with the apparatus;
a service provided by an application in communication with the apparatus and sought or consumed by the at least one peer wireless station;
a service consumed by an application in communication with the apparatus and sought, advertised, or provided by the at least one peer wireless station;
a service advertised by an application in communication with the apparatus and sought or consumed by the at least one peer wireless station; or
a service sought by an application in communication with the apparatus and advertised or provided by the at least one peer wireless station.

15. A non-transitory computer readable memory medium storing program instructions executable by processing circuitry of a wireless station to:
synchronize timing to a first peer wireless station, wherein the first peer wireless station is anchor master of a first cluster of wireless stations, wherein the wireless station and the first peer wireless station are associated with the first cluster;
receive a beacon from a second peer wireless station via a peer-to-peer communication protocol, wherein the beacon includes an indication of one or more services supported by the second peer wireless station, wherein the second peer wireless station is associated with a second cluster of wireless stations;

determine, based at least in part on the indication of one or more services supported, a service that is common to both the wireless station and the second peer wireless station; and in response to determining the service, initiate a merger of the first cluster and the second cluster.

16. The non-transitory computer readable memory medium 15, wherein the indication of one or more services supported comprises a service hash of services supported by the second peer wireless station;

wherein to determine the service, the program instructions are further executable to:

generate a local hash of services supported by the wireless station; and compare the local hash to the service hash.

17. The non-transitory computer readable memory medium 15, wherein the indication of services supported specifies at least one parameter for synchronization, wherein the at least one parameter comprises at least one of:

a service identifier;

a hash of supported services; or a network name.

18. The non-transitory computer readable memory medium 15, wherein services supported by the second peer wireless station comprise at least one of:

a service provided by the second peer wireless station;

a service consumed by the second peer wireless station;

a service advertised by the second peer wireless station; or a service sought by the second peer wireless station.

19. The non-transitory computer readable memory medium 15, wherein the service comprises at least one of:

a service provided by the second peer wireless station and sought or consumed by the wireless station;

a service consumed by the second peer wireless station and sought, advertised, or provided by the wireless station;

a service advertised by the second peer wireless station and sought or consumed by the wireless station;

a service sought by the second peer wireless station and advertised or provided by the wireless station;

a service provided by the wireless station and sought or consumed by the second peer wireless station;

a service consumed by the wireless station and sought, advertised, or provided by the second peer wireless station;

a service advertised by the wireless station and sought or consumed by the second peer wireless station; or a service sought by the wireless station and advertised or provided by the second peer wireless station.

20. The non-transitory computer readable memory medium 15, wherein the indication of services supported comprises hashes of services supported by the plurality of peer wireless stations.

* * * * *